March 23, 1937. M. BOURDON DE LAUNAY 2,074,779
EXPANSIBLE NUT UNABLE TO WORK LOOSE
Filed July 6, 1934

M. Bourdon de Launay
INVENTOR

By Marks & Clerk Attys.

Patented Mar. 23, 1937

2,074,779

UNITED STATES PATENT OFFICE 2,074,779

EXPANSIBLE NUT UNABLE TO WORK LOOSE

Maurice Bourdon de Launay, Le Quillio, France

Application July 6, 1934, Serial No. 734,036
In France July 10, 1933

1 Claim. (Cl. 151—21)

This invention relates to an expansible nut unable to work loose, constituted by a wire wound on itself about a mandrel having the desired diameter, so that the turns, which must be in contact with each other, form a kind of tube, the hollow central element obtained being subsequently internally screw-threaded according to the desired pitch.

The wire used can have any suitable cross section; however, in order to obtain turns which firmly fit against each other, as well at the exterior as at the interior, use will preferably be made of a wire having a trapezoidal cross section; this wire, after it has been wound edgewise on the mandrel assumes a rectangular or approximately rectangular cross section.

Thus, the nut forming the subject-matter of the present invention, instead of being machined in the lathe as ordinary nuts, is constituted by a wire, of suitable cross section, as indicated above, wound edgewise about a mandrel having a diameter equal to that of the hole which should have been bored in the metal bar for forming an ordinary nut; the outer diameter of the nut will of course depend on the cross section of the wire used, the dimensions of which will correspond to the size of the nut to be made; a kind of slightly flexible tube will thus be obtained, having, so to speak, the appearance of a coil spring the turns of which tightly fit against each other.

Figure 1:
Fig. 1 is a cross section of the wire before winding.
Figure 2:
Fig. 2 is a cross section of the wire after being wound into a nut.
Figure 3:
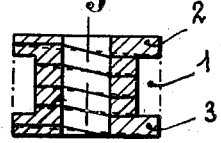
Fig. 3 is a vertical cross section of a nut made according to the present invention and externally shaped.
Figure 4:
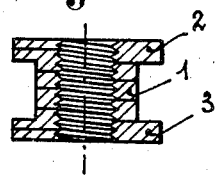
Fig. 4 shows this nut after it has been internally screw-threaded.
Figure 5:
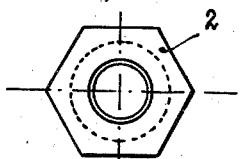
Fig. 5 is a plan view of the nut.

In order to impart greater resiliency to the middle portion of the member thus obtained, the width of the middle turns will be slightly reduced by forming therein a circular groove, as indicated at I in Fig. 3.

The portions 2 and 3 forming the head and the shoulder or flange of the nut will be either milled, or cut so as to have six or eight sides, as an ordinary nut, or cut so as to have two parallel sides, or provided with two blind holes on the upper face, the base being, in this case, preferably cut so as to present a plurality of sides; tapping is then effected, preferably by means of a semi-conical tap having a long stem, so that it is not necessary to move the tap backwards for removing it from the nut, this tapping being effected in the direction in which the turns are wound.

It will be understood that if such a nut is screwed on a screw-threaded rod having a diameter slightly greater to the extent of a few tenths of a millimeter than the tap which has been used for internally threading the nut, the screw-threaded rod can enter the nut only by expanding it to the extent of the few tenths of a millimeter it has in excess, and if it is then attempted to unscrew it as an ordinary nut, this operation will be impossible, as it would have for effect to tighten its turns so much more powerfully as the stress exerted will be greater; it will be possible to unscrew the nut only by acting on the turn or turns 3 forming the base of the nut by forcing the turns apart, from place to place on the screw-threaded rod, thus allowing the release of said nut.

For screwing on this improved nut, the same method of procedure as for an ordinary nut is adopted; however, it is preferable to act on the head 2 only, this rendering the screwing on operation easier; on the contrary, for unscrewing the nut, it is absolutely necessary to act on the base 3, as indicated above; if the middle turn or turns were acted upon, it would be impossible to cause the nut to rotate in either direction; it is for this reason that it is necessary to provide the groove I in the middle portion of the nut, as well for imparting greater resiliency to the turns of this middle portion, as above stated, as for preventing the wrench from acting on these turns when tightening or loosening the nut; it is to be pointed out that this nut has simply to be screwed home without having to lock it, the locking operation would only tend to distort the turns, which would diminish its adherence to the rod; the necessity of not locking this nut has led to give it an external appearance distinctly different from ordinary nuts so that it should not be manipulated as the latter, particularly owing to the presence of the groove I.

This nut should be tightened on a smooth washer and not on a Grover washer; for preventing calking, a washer made of parchment, or of any other relatively thin fibrous material, can be arranged between the washer and the member to be clamped; when the improved nut is used as a lock-nut, it is also convenient to interpose a smooth washer between both nuts.

Figure 6:
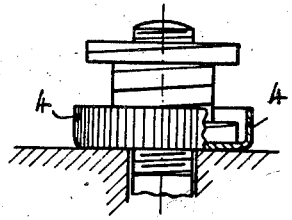
Figs. 6 and 7 illustrate the adjunction to this nut of members preventing it from being removed.
Figure 7:
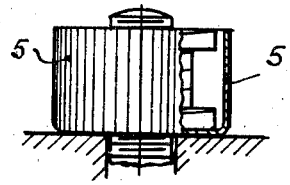

For screwing and unscrewing, it will be necessary to use a flat wrench so as to act only on the head, or on the base of the nut; use can also be made of a tubular wrench, one of the ends of which will serve to act on the base for unscrewing, and the other end, provided with an inner bearing portion, can only act on the head for screwing the nut; if the nut was to support great tensile stresses tending to distort it by causing the turns to straddle the threads of the screw-threaded rod, the nut might be provided with an outer jacket or with a pressed or flanged washer which would prevent this straddling of the turns. The adjunction of a washer pressed in the shape of a cup-like member 4 (Fig. 6) about the base, or of a jacket 5 (Fig. 7) surrounding the nut and made of soft metal or of steel, will prevent the removal of the said nut since it can be unscrewed only by acting on its base and that for having access to this base it would be necessary to damage or to break the washer or the jacket.

If in addition to the tensile stress to be supported, the screw-threaded rod is to be subjected to a stress tending to unscrew it (as the pivot pin of the right-hand pedal of a bicycle which must have a left-hand screw-thread so as not to constantly unscrew), it would be convenient in this case, to wind the turns of the nut in a direction reverse to the tapping, that is to say from right to left, if the screw has a right-hand thread, and from left to right, if it has a left-hand thread.

It will then be necessary, in this case, for screwing the nut, to act on the lower turn of the same, and on the upper turn for unscrewing it, that is to say the reverse of the operation indicated above when the turns of the nut are wound in the same direction as the screw-threads of the rod; in this case, the nut can be firmly locked without any risk of distorting it as this might happen in the first case under consideration, that is to say when it was necessary to act on the head of the nut for unscrewing it.

For obtaining a perfect contact of the screw-threads of the rod and of the nut without running the risk that they are in contact only at their apices, the tapping can be effected with a tap having full screw-threads instead of a tap having screw-threads reduced to the extent of one eighth as is usual, and the nut will be bored according to a diameter slightly greater than that of the core of the screw-threaded rod; use might also be made of a special tap the flanks of the screw-threads of which would be parallel to each other on a few tenths of a millimeter of their end and would present at their end a square cross section, or a square cross section with the angles cut off, the end of the threads might also be rounded; these taps would have for advantage that they cannot engage between the turns of the nut during the tapping operation.

These various taps present also the further advantage of creating at the top of the threads a free or empty space for receiving the filings or other foreign bodies which might prevent proper adherence of the flanks of the threads of the rod and of the nut.

Instead of tapping the nut according to a diameter a few tenths of a millimeter smaller, greater accuracy would be obtained by internally threading it to the exact diameter, then by reducing the diameter after tapping by tightening the turns on a smaller mandrel, or again by holding the nut in expanded condition during the tapping operation and by allowing it to return to a smaller diameter by its own resiliency.

The rod, by entering the nut, would restore the screw-threads to their normal position and the screw-threads of the rod and of the nut would also have a better contact than that they could have when the nut has simply been threaded to a smaller diameter.

The body of the nut is capable of expanding in both its dimensions, that is to say, in diameter and in length, and, consequently, of reacting by its resiliency, at right angles and parallel to its axis, and this simultaneously.

The first of these effects has alone been used in internally threading a nut to a diameter a few tenths of a millimeter smaller than that of the screw-threaded rod, the second of these effects can be simultaneously employed by using a tap the pitch of which is slightly smaller than that of the screw-threaded rod, this difference being small enough to be nearly negligible, when two or three threads (that is to say the thickness of a turn) are considered, but this difference is however sufficient for preventing the turns from remaining in contact when the threads of the nut must engage with those of the screw-threaded rod.

The turns then react parallel to the axis of the nut, and this action will be added to that already obtained in the direction of the diameter.

Consequently, the flexibility, instantaneousness and energy of the clamping action at right angles to the axis will also be increased, owing to the fact that the turns being no longer exactly in contact with each other, no friction will prevent their reaction.

For a rod screw-threaded to 8 millimeters, pitch 125 for instance, the nut will be tapped to 7,8 millimeters, pitch 120 to 122.

As these two reactions, one at right angles, the other parallel to the axis are sufficient to prevent separately, the nut from loosening, they can obviously be used either separately, or, preferably, simultaneously.

What I claim as my invention and desire to secure as Letters Patent is:—

Expansible lock nut comprising a helical metal wire of rectangular cross section with the turns in contact with each other, a screw thread cut on the inner wall of slightly smaller diameter that the screw threaded rod upon which it has to be screwed and a circular groove cut on the outer cylindrical wall leaving a head and a base said nut upon axial application to the threaded rod being expanded to prevent retrograde movement.

MAURICE BOURDON de LAUNAY.